United States Patent
Yamamoto

(10) Patent No.: US 12,314,354 B2
(45) Date of Patent: May 27, 2025

(54) CONTROL METHOD FOR IMAGE DISPLAY DEVICE AND IMAGE DISPLAY DEVICE

(71) Applicant: SHARP KABUSHIKI KAISHA, Sakai (JP)

(72) Inventor: Takashi Yamamoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 319 days.

(21) Appl. No.: 17/866,157

(22) Filed: Jul. 15, 2022

(65) Prior Publication Data
US 2023/0047043 A1     Feb. 16, 2023

(30) Foreign Application Priority Data
Aug. 10, 2021  (JP) .................................. 2021-130710

(51) Int. Cl.
G06F 21/31       (2013.01)

(52) U.S. Cl.
CPC .................................. *G06F 21/31* (2013.01)

(58) Field of Classification Search
None
See application file for complete search history.

(56) References Cited

U.S. PATENT DOCUMENTS

| | | |
|---|---|---|
| 2015/0138082 A1 | 5/2015 | Nagata |
| 2016/0359849 A1* | 12/2016 | Nakajima ........... H04L 63/0853 |
| 2017/0017430 A1* | 1/2017 | Mukasa ................ G06F 3/1203 |
| 2017/0045957 A1* | 2/2017 | Holmgren .............. H04N 23/90 |
| 2017/0177190 A1* | 6/2017 | Inoue .................. H04L 12/1822 |

FOREIGN PATENT DOCUMENTS

JP          2014-010531 A          1/2014

* cited by examiner

*Primary Examiner* — Jeffrey R Swearingen
(74) *Attorney, Agent, or Firm* — ScienBiziP, P.C.

(57) ABSTRACT

A controller of an image display device generates an access restriction parameter for identifying a user who is using the image display device and a user who is not using the image display device among the users who access the Web page stored in a server device, displays an access display component including information representing the access restriction parameter on the display, and updates display of the access restriction parameter and the access display component in accordance with a usage state of the image display device. Then, operation to the Web page by a user who accesses the Web page by using a parameter different from the access restriction parameter is restricted.

8 Claims, 4 Drawing Sheets

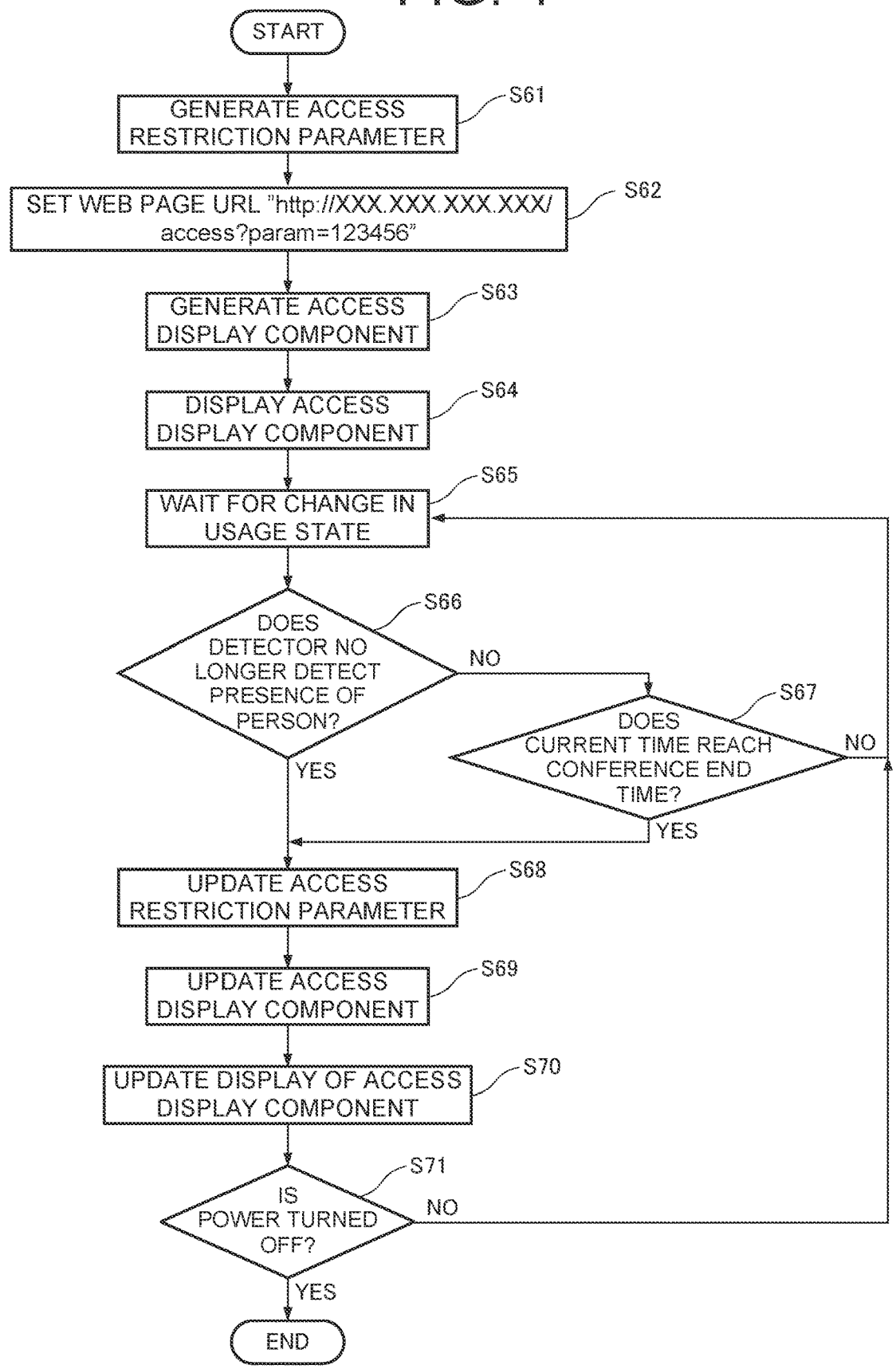

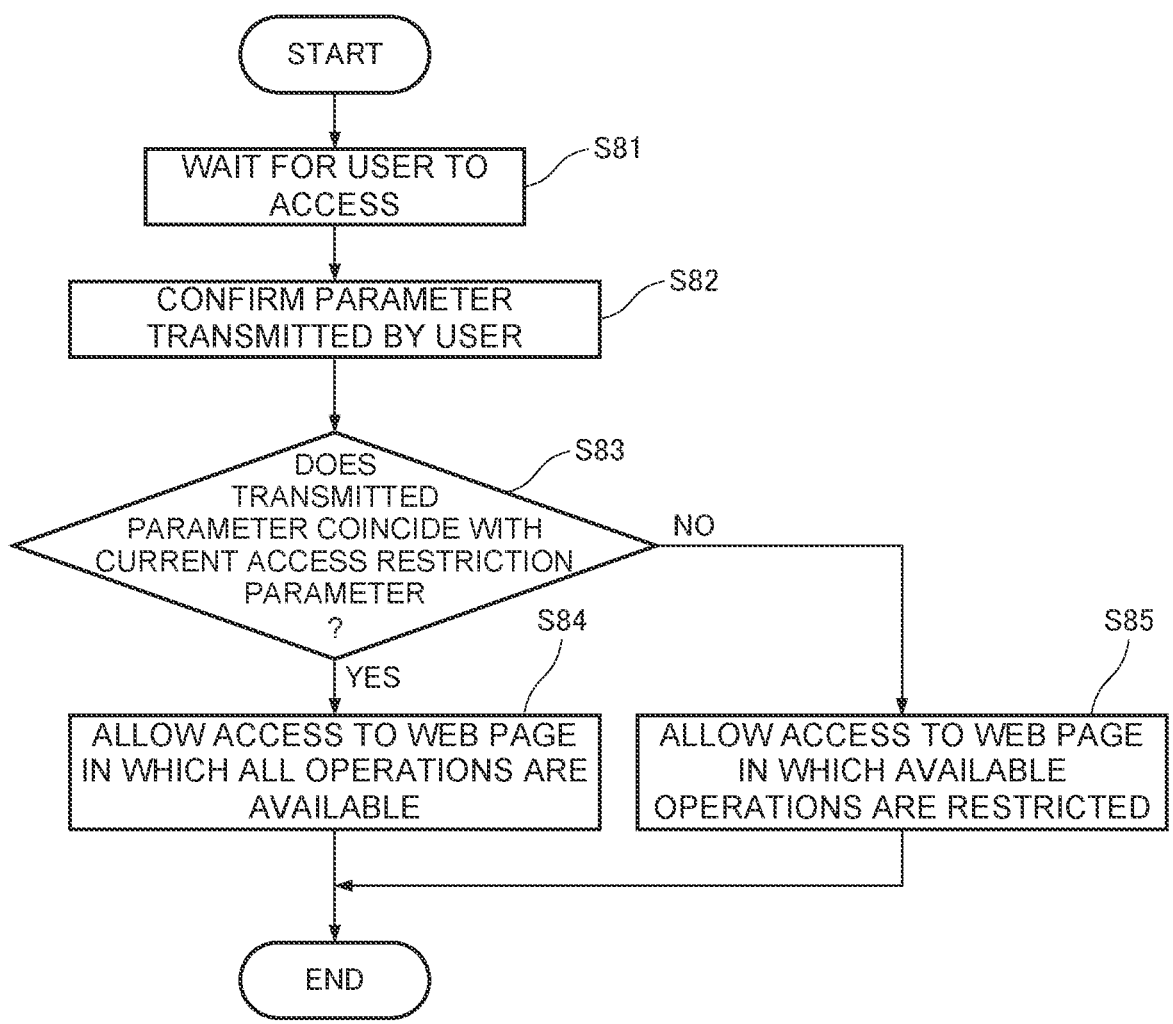

CONTROL METHOD FOR IMAGE DISPLAY DEVICE AND IMAGE DISPLAY DEVICE

INCORPORATION BY REFERENCE

This application claims the priority based on Japanese Patent Application No. 2021-130710 filed on Aug. 10, 2021 under 35 U.S.C. 119, the contents of which are hereby incorporated herein.

BACKGROUND

The present disclosure relates to a control method for an image display device. In addition, the present disclosure relates to an image display device including a display that displays an image.

Blackboards and whiteboards are used as tools for visually communicating or posting information to participants in conferences, training sessions, and other meetings in which a plurality of people participate. With the development of electronic technology, functions of the blackboards and the whiteboards are converted into electronic formats. That is, an electronic device that can display information indicated as an image to participants on a screen and reflect operation of a user on the screen is put to practical use.

An electronic blackboard or whiteboard is called an electronic blackboard or an interactive whiteboard (IWB). In an image display device such as the IWB, operation of a user to a screen displaying an image is reflected in the image. For example, when a user performs a handwriting operation with a device called a stylus or a touch pen, or with a his or her bare hand, traces of the handwriting operation are displayed on a screen. The image display device such as the IWB reflects the operation of the user to the screen on an image, so that the same function as handwritten input on a conventional blackboard or whiteboard is realized.

The image display device such as the IWB also realizes a function which cannot be obtained by the conventional blackboard or whiteboard. For example, according to an image display device described in Japanese Unexamined Patent Application Publication No. 2014-010531, it is possible to reflect operation of a user to a terminal device other than the image display device that actually displays an image on an image being displayed by the image display device.

SUMMARY

A control method for an image display device as an example of an embodiment according to the present disclosure is a control method for an image display device capable of changing operation in accordance with operation to a Web page by a user, the control method including: generating an access restriction parameter for identifying a user who is using the image display device and a user who is not using the image display device among the users who access the Web page; displaying an access display component including information indicating the access restriction parameter on the image display device; restricting operation to the Web page by a user who accesses the Web page by using a parameter different from the access restriction parameter; updating the access restriction parameter in accordance with a usage state of the image display device; and updating the access display component to be displayed on the image display device when the access restriction parameter is updated.

An image display device as an example of an embodiment according to the present disclosure is an image display device including: a display that displays an image; a communicator that is capable of communicating with a server device which stores a Web page; and a controller that controls the display, wherein the controller changes operation of the image display device in accordance with operation by a user to the Web page corresponding to the image display device, the Web page being stored in the server device, the controller generates an access restriction parameter for identifying a user who is using the image display device and a user who is not using the image display device among the users who access the Web page, displaying an access display component including information representing the access restriction parameter on the display, updating display of the access restriction parameter and the access display component in accordance with a usage state of the image display device, and restricting operation to the Web page by a user who accesses the Web page by using a parameter different from the access restriction parameter.

BRIEF DESCRIPTION OF THE DRAWINGS

FIG. 4 is a flowchart illustrating a flow of a process of generating and updating an access display component.

FIG. 5 is a flowchart illustrating a flow of a process when a user accesses a Web page.

DETAILED DESCRIPTION

Figure 1:
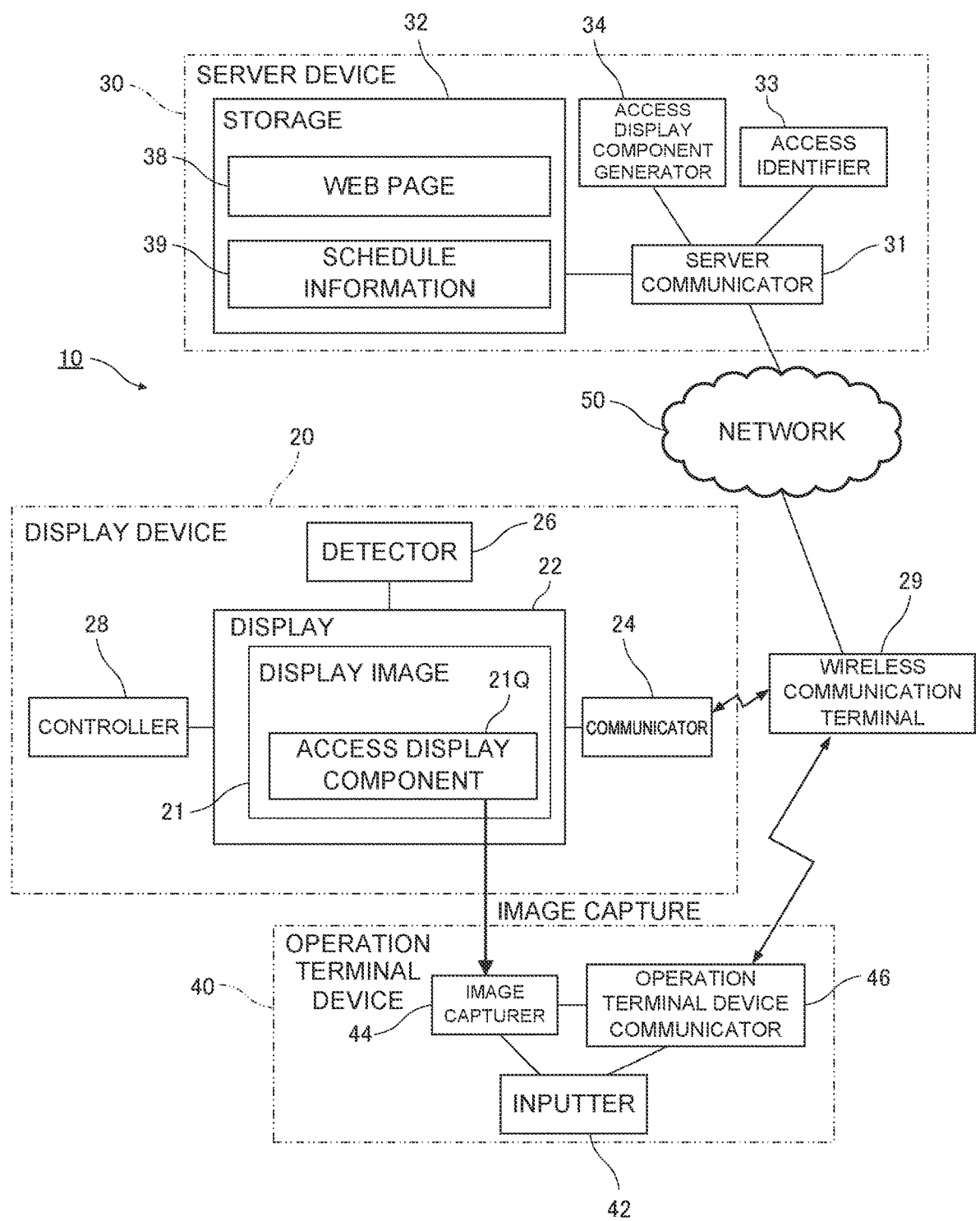
FIG. 1 is a block diagram of a computer system including an image display device as an example of an embodiment according to the present disclosure.

FIG. 1 is a block diagram of a computer system 10 including an image display device 20 as an example of an embodiment according to the present disclosure. The computer system 10 illustrated in FIG. 1 includes a server device 30, and an operation terminal device 40, in addition to the image display device 20.

For an explanation purpose, the image display device 20 and the server device 30 are illustrated separately in FIG. 1, but the server device 30 may be incorporated in the image display device 20. That is, the image display device 20 itself may have a web server function.

About Image Display Device 20

The image display device 20 illustrated in FIG. 1 includes a display 22, a communicator 24, a detector 26, and a controller 28. The display 22 is a screen capable of displaying an image. The communicator 24 is a communication unit that communicates with the server device 30. The detector 26 is a detection unit that detects the presence of a person who is using the image display device 20. The controller 28 is a control unit (e.g., an arithmetic unit such as a microprocessor) that controls the operation of the image display device 20, especially controls image display by the display 22.

The image display device 20 is typically an electronic blackboard or an IWB. However, a device capable of displaying an image and communicating with the server device 30 generally functions as the image display device 20 in FIG. 1. For example, a personal device such as a tablet device and a smartphone also functions as the image display device 20. Alternatively, a large device such as a screen device used outdoors also functions as the image display device 20.

The display 22 of the image display device 20 is typically a liquid crystal screen. However, the display 22 may be capable of displaying visual information based on image data under control by the controller 28, and may be a cathode-ray tube screen, a plasma display panel, a projector, or the like. The display 22 may be composed of a touch panel and accept input from a user.

The communicator 24 communicates with the server device 30 via wireless communication. In a case where, for example, a network card for wireless LAN is provided as the communicator 24, the communicator 24 communicates with the server device 30 over a network 50 via a wireless communication terminal 29 connected to the network 50 (a computer network such as the Internet) (e.g. a communication device such as an Ethernet (registered trademark) interface module). The communication between the communicator 24 and the server device 30 may be performed by wired communication, and the communicator 24 may be a network card for wired LAN.

In a case where the server device 30 is incorporated in the image display device 20 such as an IWB, the image display device 20 and the server device 30 may communicate directly with each other by using an internal signal without going through the network 50.

The detector 26 detects whether or not a person is present in the vicinity of the image display device 20, that is, whether or not a person being using the image display device 20 is present, by, for example, a camera device or a motion sensor (a sensor that detects human movement at a specific location using infrared rays or the like). The detector 26 may be any device capable of detecting whether or not a person is present in the vicinity of the image display device 20. For example, a thermography device also functions as the detector 26.

The controller 28 is an arithmetic unit such as a microprocessor. The controller 28 controls communication with the server device 30 via the communicator 24, and controls operation of various functions in the image display device 20, such as control of communication with the server device 30 via the communicator 24, and determination as to whether or not the presence of a person being in the vicinity is detected by the detector 26, in addition to control of the display of an image by the display 22.

Server Device 30

The server device 30 in FIG. 1 includes a server communicator 31 that communicates with the network 50, and a storage 32 that stores various data. The storage 32 in FIG. 1 stores data of a Web page 38 corresponding to the image display device 20 (such as an HTML file and a CGI script). The storage 32 in FIG. 1 also stores schedule information 39 (data such as start time and end time of each meeting) of meetings (gatherings using the image display device 20 such as conferences, training, and recreation) using the image display device 20. The data of the schedule information 39 (data on what time and day the image display device 20 is to be used) is, for example, input into the storage 32 of the server device 30 in advance by a user who plans to hold a meeting using the image display device 20.

To the schedule information 39, data only needs to be input at the time when reading is performed. In addition to the previous input to the storage 32 by a user, data can be input into the schedule information 39 in a variety of ways. For example, the data of the schedule information 39 may be acquired from a storage device other than the storage 32 in which the schedule information 39 is stored (such as an external server device, different from the server device 30). As a specific example, the user's schedule information managed by a schedule management service operated on a cloud server may be read as the schedule information 39 of this embodiment through communication.

The server device 30 includes an access display component generator 34 and an access identifier 33. The access display component generator 34 generates image data of an access display component 21Q. The access display component 21Q is a small image that is superimposed and displayed on a display image 21 of the image display device 20 in order to guide the user using the image display device 20 to the Web page 38. The access display component 21Q is generated as an image capable of indicating various information such as numerical values and characters according to predetermined rules (standards), such as two-dimensional codes and bar codes. In this embodiment, the information indicated by the access display component 21Q includes URL (information indicating the location of specific data in the network 50) of the Web page 38. In a case where the server device 30 is incorporated in the image display device 20, the access display component generator 34 may be provided as one of the functions of the controller 28 of the image display device 20.

The access identifier 33 identifies whether or not the user who attempts to access the data of the Web page is a user who is currently using the image display device 20. In this embodiment, the user who accesses the Web page 38 is identified as a user who is currently using the image display device 20, by the guidance by the access display component 21Q generated by the access display component generator 34.

In this embodiment, the storage 32, the access identifier 33, the access display component generator 34 of the server device 30 are configured as functions that the server device 30 has. That is, a storage area that stores the Web page 38 and the schedule information 39 functions as the storage 32. Software that performs a user identification process and software that performs a generation process of the access display component 21Q function as respective software units, namely, function as the access identifier 33 and the access display component generator 34, respectively.

Operation Terminal Device 40

The operation terminal device 40 illustrated in FIG. 1 is a device carried by a user using the image display device 20. Specifically, a smartphone or a tablet terminal functions as the operation terminal device 40. The operation terminal device 40 in this embodiment includes an inputter 42 that accepts input from a user, an image capturer 44 that captures an image of the access display component 21Q that appears in the display image 21 of the image display device 20, and an operation terminal device communicator 46 that communicates with the server device 30.

In a smartphone or a tablet terminal, a touch panel display functions as the inputter 42. The touch panel display not only accepts input from the user, but can also display a notification from the server device 30 (e.g., whether or not access to the Web page 38 is permitted).

In this embodiment, a camera device in a smartphone or a tablet device functions as the image capturer 44. In a case where a model without the camera device is used as the operation terminal device 40, a device that captures the image of the access display component 21Q, such as a camera device, a bar code reader, and a two-dimensional code reader, may be connected to the operation terminal device 40 as the image capturer 44.

The image capturer 44 should include a function of analyzing information indicated by the captured image of the access display component 21Q. Specifically, the image capturer 44 captures the image of the access display component 21Q to find the information indicated by the access display component 21Q (such as the URL of the Web page 38). In a case where the image capturer 44 itself does not have a function of analyzing information, the control unit of the operation terminal device 40 (CPU of a smartphone or a tablet device) of the operation terminal device 40 may perform analysis.

The operation terminal device communicator 46 is a communication unit capable of communicating with the server device 30 via the network 50 by wireless communication. In a case where the URL of the Web page 38 in the information indicated by the access display component 21Q is found, the URL of the Web page 38 is transmitted from the image capturer 44 to the operation terminal device communicator 46, and the operation terminal device communicator 46 accesses the Web page 38 stored in the server device 30 via the wireless communication terminal 29 and the network 50.

In this embodiment, the operation terminal device 40 has a function of operating a Web browser. That is, the operation terminal device 40 has a Web client function. The operation terminal device 40 that accesses the Web page 38 displays the Web page 38 on a touch panel display as the inputter 42 by a Web browser. The Web page 38 includes a user interface corresponding to the display image 21 displayed on the display 22 of the image display device 20. The user of the operation terminal device 40 can operate the image display device 20 by operating the user interface of the Web page 38 via the inputter 42. In a case where the image display device 20 has the web server function, the image display device 20 having a web server function is controlled from the operation terminal device 40 having a web client function.

The operation of the image display device 20 typically means to change the display image 21. In a case where the image display device 20 has a voice output function, the user can also adjust the volume of voice output from the image display device 20 by using the Web page 38. In addition, the user can also adjust a function of superimposing the information of the image display device 20 itself (such as display of setting information) on externally input video or image, a so-called OSD (On-Screen Display). In addition to the above, depending on the user interface of the Web page 38, the user can perform any other operation related to the operation of the image display device 20.

User Interface Example of Web page

Figure 2:
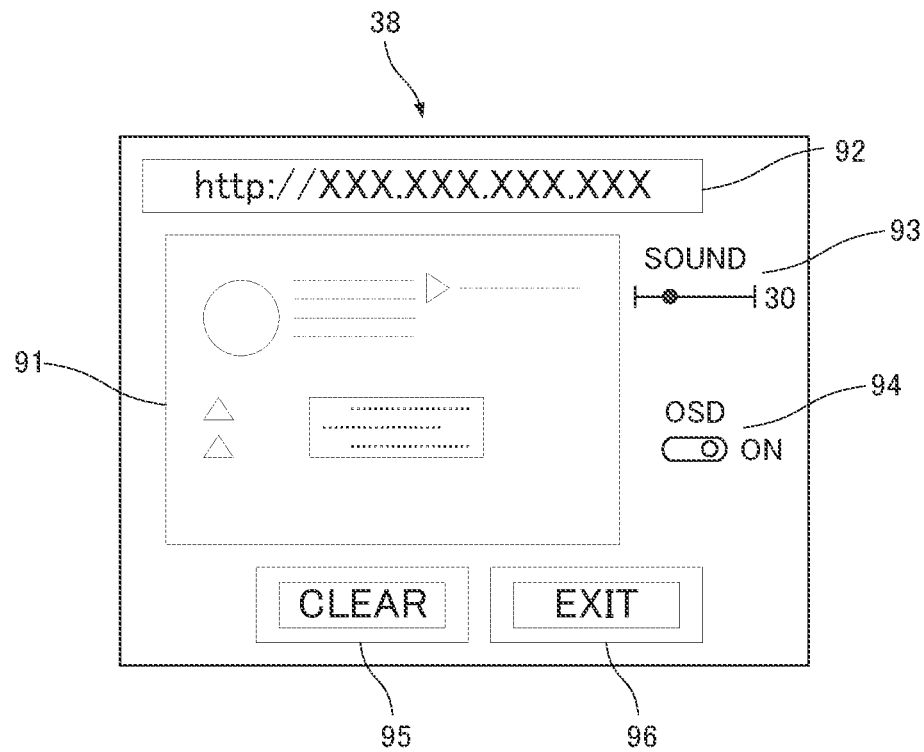
FIG. 2 is a diagram illustrating an example of a Web page in FIG. 1.

FIG. 2 illustrates an example of the Web page 38 stored in the storage 32.

The Web page 38 in FIG. 2 is provided with an image editor 91, a URL display 92, a volume setter 93, an OSD setter 94, a CLEAR button 95, and an EXIT button 96. The user can edit and change the display image 21 of the image display device 20 by operating the image editor 91. The URL display 92 displays the URL of the Web page 38 corresponding to the image display device 20. The user can adjust the volume of voice played along with an image or video displayed on the image display device 20 by operating a volume slider in the volume setter 93. The user can change whether or not setting information or the like is superimposed and displayed on the display image 21 of the image display device 20, by operating a toggle switch in the OSD setter 94. The user can press the CLEAR button 95 to erase all of the contents of the image editor 91. The user can press the EXIT button 96 to terminate the operation of the Web page 38.

Figure 3:
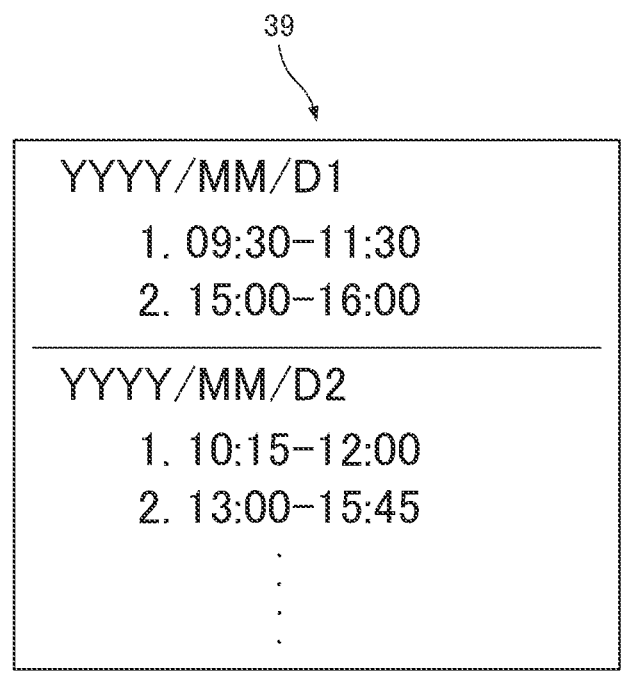
FIG. 3 is a diagram illustrating an example of schedule information in FIG. 1.

Example of Schedule Information FIG. 3 illustrates an example of the schedule information 39 stored in the storage 32. The schedule information 39 in FIG. 3 records schedule information for two days. On the day of "YYYY/MM/D1", the image display device 20 is scheduled to be used during the time zone of "9:30-11:30" and the time zone of "15:00-16:00". On the day of "YYYY/MM/D2", the image display device 20 is scheduled to be used during the time zone of "10:15-12:00" and the time zone of "13:00-15:45".

Generation and Update of Access Restriction Parameter/Access Display Component

FIG. 4 is a flowchart illustrating a flow of a process for generating and updating the access display component. Hereinafter, a process performed in the image display device 20 and the server device 30 in a case where the image display device 20 is used in the computer system 10 of this embodiment will be described according to the flowchart of FIG. 4.

The image display device 20 that starts up (START) by turning on the power or by other means first generates an access restriction parameter (Step S61). The access restriction parameter is used to identify a user who is using the image display device 20 and a user who is not using the image display device 20. The access restriction parameter is a parameter whose value is different each time an access restriction parameter is generated. For example, the controller 28 can input a current time value into a hash function and a resulting hash value can be used as the access restriction parameter. In this embodiment, it is assumed that the access restriction parameter generated at the startup of the image display device 20 is "123456".

The image display device 20 transmits the generated access restriction parameter to the server device 30 (via the network 50, if necessary). The server device 30 sets the URL of the Web page 38 corresponding to the image display device 20 that transmits the access restriction parameter (Step S62). The URL of the Web page 38 is divided into a basic address part indicating an IP address or an FQDN of the Web page 38 and a parameter part. In this embodiment, it is assumed that the basic address part is "http://XXX.XXX.XXX.XXX".

The server device 30 may update the basic address part each time the image display device 20 is started, but in this embodiment, the basic address part is assumed to remain constant. In Step S62, the server device 30 sets, as a Web page URL, a character string obtained by adding the access restriction parameter as a URL parameter (query character string) to the end of the basic address part. In this embodiment, the Web page URL is "http://XXX.XXX.XXX.XXX/access?param=123456".

The access display component generator 34 of the server device 30 generates the access display component 21Q based on the set a Web page URL (Step S63). That is, image data including information indicating a character string of the Web page URL is generated in accordance with the standard for a two-dimensional code and a bar code.

The generated image data of the access display component 21Q is transmitted to the image display device 20 via the network 50. The image display device 20 that receives the access display component 21Q superimposes and displays the access display component 21Q on the display image 21 displayed on the display 22. (Step S64). The position of the access display component 21Q in the display image 21 may be fixed near an edge of the display 22, or the like, or may be changeable in accordance with the setting by the user.

After the access display component 21Q is displayed on the display 22, the access restriction parameter and the access display component 21Q are maintained until a usage state of the image display device 20 changes (Step S65). The usage state of the image display device 20 is information about the use of the image display device 20, such as what the image display device 20 is being used for, who is using the image display device 20, how many hours the image display device 20 is being used. For example, if the image display device 20 is installed in a conference room, information such as whether there is any user remaining in the conference room, and from what time to what time the image display device 20 is used for a conference is referenced as the usage status of the image display device 20.

With respect to the usage status, for example, whether any user remains in the conference room, it is possible to examine the change in the usage status by using the detector 26 of the image display device 20. That is, the presence or absence of a user in the conference room is determined by whether the detector 26 detects the presence of a person or no longer detects the presence of a person (Step S66).

As a specific example, if the detector 26 is a camera device, the detector 26 captures an image in the conference room and determines whether or not a person is seen in the captured image by image recognition software or other means. When no person is seen in the captured image in the conference room, it is determined that there is no person in the conference room, that is, there is no longer a person using the image display device (Step S66—YES).

When it is determined that a person using the image display device is no longer present, the controller 28 of the image display device 20 determines that the usage state of the image display device 20 is changed and updates the access restriction parameter (Step S68).

On the other hand, when a person is seen in the captured image in the conference room, it is determined that a person is in the conference room (Step S66—NO). However, in a case where the conference room is used for a plurality of conferences that are consecutive in time, even when the first conference ends, there is a possibility that a person who will participate in the next meeting remains in the conference room. In a case where a person is in the conference room, the controller 28 checks the schedule information 39 stored in the storage 32 of the server device 30 and the current time, and confirms whether or not the current time reaches conference end time (Step S67).

When the current time does not yet reach the conference end time, it is determined that the usage state of the image display device 20 is not changed, and the process flow returns to Step S65 and waits for the usage state to change again (Step S67—NO).

On the other hand, in a case where the current time reaches the conference end time (Step S67—YES), the controller 28 determines that the usage state of the image display device 20 is changed, proceeds to Step S68, and updates the access restriction parameter.

When the access restriction parameter is updated, the controller 28 transmits a new access restriction parameter to the server device 30. The server device 30 that receives the new access restriction parameter generates, by means of the access display component generator 34, a new access display component 21Q corresponding to the new access restriction parameter. That is, the access display component 21Q is updated (Step S69).

When the access display component 21Q is updated, the server device 30 transmits a new access display component 21Q to the image display device 20. The image display device 20 that receives the new access display component 21Q erases the previous access display component 21Q from the display image 21, and displays the new access display component 21Q. That is, the access display component 21Q to be displayed on the image display device 20 is updated (Step S70).

In a case where the power of the image display device 20 is turned off (Step S71—YES), the operation of the image display device 20 ends (END). When the power of the image display device 20 is not turned off (Step S71—NO), the image display device 20 returns to the state of waiting for change in the usage state (returns to Step S65) after the update of the access display component 21Q in Step S70. For the sake of explanation, Step S71 is illustrated in FIG. 4 as if the determination is performed after Step S70. However, the operation of the image display device 20 ends at any timing as long as the power is turned off.

As described above, the access restriction parameter and the access display component 21Q to be displayed on the image display device 20 are dynamically updated in accordance with the usage state of the image display device 20. That is, when the conference ends, or when there is no person in the conference room, the previous access restriction parameter is immediately invalidated and the access display component 21Q that indicates the new access restriction parameter is displayed on the image display device 20. Therefore, even a user who participates in the previous conference is not able to know the current access restriction parameter when the user leave the conference room after the conference is finished. On the other hand, a user who newly enters the conference room is able to know the current access restriction parameter from the access display component 21Q displayed on the image display device 20.

Access Control to Web Page

FIG. 5 is a flowchart illustrating a flow of a process performed when a user accesses the Web page 38. In the following, a process performed by the access identifier 33 of the server device 30 when the user accesses the Web page 38 via a web browser of the operation terminal device 40 in the computer system 10 of this embodiment will be described according to the flowchart in FIG. 5.

First, the access identifier 33 waits for the user to access the Web page 38 via the web browser (START—Step S81). The user transmits, to the server device 30, data meaning request of access to a specific URL, for example, by capturing the image of the access display component 21Q by means of the image capturer 44, or by directly inputting the URL into an address bar of the web browser.

When a character string that coincides with the basic address part of the Web page 38 is included in the data transmitted by the user, the access identifier 33 confirms the parameter part added to the basic address part, that is, the parameter transmitted by the user (Step S82).

Then, it is determined whether or not the parameter transmitted by the user coincides with a current access restriction parameter (for example, "123456") (Step S83). When the parameter transmitted by the user coincides with the current access restriction parameter (Step S83—YES), the access identifier 33 identifies that the user who is using the image display device 20 requests access. The user who is using the image display device 20 is permitted to access the Web page 38 in a state in which all operations are available (Step S84).

On the other hand, in a case where the parameter transmitted by the user does not coincide with the current access restriction parameter, that is, in a case where a parameter different from the access restriction parameter is used, the access identifier 33 identifies that the user who is not using the image display device 20 requests access. In a case where the parameter itself is not transmitted, it is treated as if an empty data parameter was transmitted, and it is determined that access is made using a parameter different from the access restriction parameter. The user who is not using the image display device 20 (other than the user using the image display device) is allowed to access to the Web page 38, but operation available for the Web page 38 is restricted (Step S85). After the user is allowed to access the Web page 38 as described above, the access control process to the Web page 38 ends (END) and the user returns to the state of waiting for access (return to START).

The state in which the operation available for the Web page 38 is restricted is a state in which operation that affects a meeting held using the image display device 20 is restricted. In particular, operation related to the content of the display, such as change or erase of the display image 21 and display of a cursor or other user interface on the display 22, is restricted or prohibited. A specific type of operation to be restricted can be arbitrarily set by an administrator of the image display device 20. Depending on the settings, it is possible to prohibit not only the change of the display image 21, but also the viewing of the display image 21 through a Web browser.

How to restrict the operation of the Web page 38 can be accomplished in a variety of ways. For example, when a user who is not using the image display device 20 accesses the Web page 38, a user interface corresponding to restricted operation may be grayed out and rendered inoperable. Alternatively, a restricted Web page with a limited function may be prepared separately from the original Web page 38, and a user who is not using the image display device 20 may is allowed to access the restricted Web page.

In the computer system 10 of this embodiment, the control method of the image display device including the above step is implemented, so that the user who is currently using the image display device 20 and the user who is not currently using the image display device 20 can be identified. The user who is currently using the image display device 20 can freely operate the image display device 20 via the Web page 38, while operation to the Web page 38 by the user who is not currently using the image display device 20 is restricted. Therefore, it is possible to prevent the display contents of the image display device 20 from being changed by the user who is not using the image display device 20, or to prevent the user who is not using the image display device 20 from knowing the contents of the display.

Furthermore, according to the control method described above, when the usage state of the image display device 20 changes, such as when a person is no longer in the conference room and when it is time to end the meeting, the access restriction parameter and the access display component 21Q are dynamically updated. Therefore, even a user who knows a previous access restriction parameter cannot know a current access restriction parameter when the usage state of the image display device 20 changes, and therefore the leakage of information such as a conference using the image display device 20 to previous conference participants is prevented.

On the other hand, the user who is using the image display device 20 can easily acquire the current access restriction parameter from the access display component 21Q displayed on the display 22 of the image display device 20, and therefore the access to the Web page 38 by the user using the image display device 20 is not restricted.

In the above embodiment, specific examples of the timing for updating the access restriction parameter (change in a usage status) are time when a person is no longer in the conference room (updating according to a detection result by the detector) and time when the conference ends (updating according to schedule information), but the access restriction parameter may be updated at other timing. For example, the operating time of the image display device 20 after the power is turned on may be measured, and the access restriction parameter may be updated every time operation lasts for a certain time (e.g., every two hours). The user of the image display device 20 may be able to update the access restriction parameter at any timing. For example, in a case where the conference ends earlier than a schedule, the user may operate the image display device 20 to update the access restriction parameter at the end of the conference.

The information indicated by the access display component 21Q includes both the basic address part of the Web page 38 (e.g., "http://XXX.XXX.XXX.XXX") and the access restriction parameter (e.g., "123456") in the above embodiment, but the access display component 21Q only illustrates the access restriction parameter. For example, a display component illustrating the basic address section (such as a two-dimensional code) is always displayed separately from the access display component 21Q, and the access display component 21Q illustrating only the access restriction parameter may be changed each time the access restriction parameter is updated.

The embodiment of the present disclosure is described above with reference to the drawings. However, the present disclosure is not limited to the embodiment described above, and can be implemented in various aspects without departing from the scope of the present disclosure. In the drawings, the components are primarily illustrated in a schematic manner for easy understanding, and the thickness, length, number, interval, and the like of each of the components illustrated differ from the reality for the sake of creation of the drawings. The material, shape, dimension, and the like of each of the components illustrated in the above embodiment are merely examples and are not particularly limited and may be variously modified without substantially departing from the constitution of the present disclosure.

The invention claimed is:

1. A control method for changing an operation of an image display device based on a user's operation on a Web page, the control method comprising:
generating, by the image display device, a single access restriction parameter for identifying a user who is using the image display device and a user who is not using the image display device among users who access the Web page;
displaying an access display component which is an image generated by encoding information of numerical values and characters based on predetermined rules, the access display component including basic address information indicating a character string for accessing the Web page and information indicating the access restriction parameter on the image display device;
accessing, by the users who access the Web page, the Web page by capturing an image of the access display component using an image capturer included in a terminal device, and transmitting data, including the basic address information and the access restriction parameter, to a server which stores the Web page;

allowing a user who accesses the Web page to access the Web page in a state in which all operations are available when the access restriction parameter included in the data, transmitted by the user, coincides with a current access restriction parameter, and allowing another user who accesses the Web page to access the Web page in a state in which all of the available operations are restricted when the access restriction parameter included in the data, transmitted by the user, does not coincide with the current access restriction parameter;

updating the access restriction parameter based on a usage state of the image display device; and updating the access display component to be displayed on the image display device when the access restriction parameter is updated.

2. The control method for the image display device according to claim 1, wherein in the updating of the access restriction parameter based on the usage state of the image display device, the access restriction parameter is updated based on schedule information of a meeting, and the image display device is used during the meeting.

3. The control method for the image display device according to claim 1, further comprising:

detecting a presence of a person who is using the image display device, wherein in the updating of the access restriction parameter based on the usage state of the image display device, the access restriction parameter is updated based on a result of detecting the presence of the person who is using the image display device.

4. The control method for the image display device according to claim 1, wherein in the updating of the access restriction parameter based on the usage state of the image display device, the access restriction parameter is updated for each timing when an operation of the image display device lasts for a certain time.

5. An image display device comprising:

a display that displays an image;

a communicator that is capable of communicating with a server device which stores a Web page; and a controller that controls the display, wherein the controller:

changes an operation of the image display device based on a user's operation to the Web page corresponding to the image display device, the Web page being stored in the server device, generates a single access restriction parameter for identifying a user who is using the image display device and a user who is not using the image display device among users who access the Web page, displays, on the display, an access display component which is an image generated by encoding information of numerical values and characters based on predetermined rules, the access display component including basic address information indicating a character string for accessing the Web page and information representing the access restriction parameter on the display, updating display of the access restriction parameter and the access display component based on a usage state of the image display device, accesses, by the users who access the Web page, the Web page by capturing an image of the access display component using an image capturer included in a terminal device, and transmitting data, including the basic address information and the access restriction parameter, to the server device, and allows a user who accesses the Web page to access the Web page in a state in which all operations are available when the access restriction parameter included in the data, transmitted by the user, coincides with a current access restriction parameter, and allows another user who accesses the Web page to access the Web page in a state in which all of the available operations are restricted when the access restriction parameter included in the data, transmitted by the user, does not coincide with the current access restriction parameter.

6. An image display device according to claim 5, wherein the access restriction parameter is updated based on schedule information of a meeting, and the image display device is used during the meeting.

7. An image display device according to claim 5, further comprising:

a detector that detects a presence of a person who is using the image display device, wherein the access restriction parameter updates based on a result of detecting the presence of the person who is using the image display device by the detector.

8. An image display device according to claim 5, wherein the access restriction parameter is updated for each timing when an operation of the image display device lasts for a certain time.

* * * * *